US010353103B1

(12) United States Patent
Olsson et al.

(10) Patent No.: US 10,353,103 B1
(45) Date of Patent: Jul. 16, 2019

(54) SELF-STANDING MULTI-LEG ATTACHMENT DEVICES FOR USE WITH UTILITY LOCATORS

(71) Applicants: Mark S. Olsson, La Jolla, CA (US); James H. Gruenbaum, North Charleston, SC (US); Ryan B. Levin, San Diego, CA (US)

(72) Inventors: Mark S. Olsson, La Jolla, CA (US); James H. Gruenbaum, North Charleston, SC (US); Ryan B. Levin, San Diego, CA (US)

( * ) Notice: Subject to any disclaimer, the term of this patent is extended or adjusted under 35 U.S.C. 154(b) by 444 days.

(21) Appl. No.: 15/006,119

(22) Filed: Jan. 26, 2016

Related U.S. Application Data

(60) Provisional application No. 62/107,985, filed on Jan. 26, 2015.

(51) Int. Cl.
*G01V 3/08* (2006.01)
*F16M 11/34* (2006.01)
*F16M 11/04* (2006.01)

(52) U.S. Cl.
CPC ............. *G01V 3/08* (2013.01); *F16M 11/041* (2013.01); *F16M 11/34* (2013.01)

(58) Field of Classification Search
CPC ...................................................... G01V 3/08
USPC ........................................................ 324/326
See application file for complete search history.

(56) References Cited

U.S. PATENT DOCUMENTS

| | | | |
|---|---|---|---|
| 7,009,399 B2 | 3/2006 | Olsson et al. | |
| 7,276,910 B2 | 10/2007 | Prsha et al. | |
| 7,288,929 B2 | 10/2007 | Prsha et al. | |
| 7,443,154 B1 | 10/2008 | Merewether et al. | |
| 7,518,374 B1 | 4/2009 | Olsson et al. | |
| 7,619,516 B2 | 11/2009 | Olsson et al. | |
| 7,825,647 B2 | 11/2010 | Olsson et al. | |
| 7,990,151 B2* | 8/2011 | Olsson .................. | G01R 19/00 324/326 |
| 8,248,056 B1 | 8/2012 | Olsson et al. | |
| 8,264,226 B1 | 9/2012 | Olsson et al. | |
| 9,703,002 B1* | 7/2017 | Olsson ..................... | G01V 3/08 |
| 2013/0127470 A1 | 5/2013 | Olsson et al. | |
| 2013/0200901 A1 | 8/2013 | Olsson et al. | |
| 2014/0111376 A1 | 4/2014 | Bench et al. | |
| 2014/0132270 A1 | 5/2014 | Olsson et al. | |
| 2015/0204995 A1 | 7/2015 | Olsson et al. | |

* cited by examiner

*Primary Examiner* — Reena Aurora
(74) *Attorney, Agent, or Firm* — Steven C. Tietsworth, Esq.; Heena Sharma

(57) ABSTRACT

Self-standing attachment devices for use with utility locator systems are disclosed. In one embodiment a self-standing attachment device includes a top assembly, three extendable legs coupled to the top assembly with a movable joint, and a bottom assembly, with the self-standing attachment device detachably coupleable to a locator of the system. A formed coupler in the top assembly allows for readily attaching and detaching the self-standing attachment device and the locator.

21 Claims, 10 Drawing Sheets

SELF-STANDING MULTI-LEG ATTACHMENT DEVICES FOR USE WITH UTILITY LOCATORS

CROSS-REFERENCE TO RELATED APPLICATIONS

This applications claims priority under 35 U.S.C. § 119(e) to U.S. Provisional Patent Application Ser. No. 62/107,985, entitled SELF-STANDING MULTI-LEG ATTACHMENT DEVICES FOR USE WITH UTILITY LOCATORS, filed on Jan. 26, 2015, the content of which is incorporated by reference herein in its entirety.

FIELD

This disclosure relates generally to electromagnetic utility locator devices used for locating buried or otherwise obscured utility lines or other conductors using magnetic field sensing and associated attachment devices and combined systems. More specifically, but not exclusively, the disclosure relates to utility locators and associated multi-leg attachment devices for allowing a utility locator to self-stand in an upright position without being held or otherwise supported by a user.

BACKGROUND

Incidents caused by improperly and/or otherwise inaccurately located utility lines have resulted in loss of human life as well as costly damage to infrastructure. In a traditional utility line locating operation (also referred to simply as a "locate"), a user moves about an area with a utility locator device in hand to determine the location of one or more buried utility or utilities such as buried pipes, wires, or other conductors. Locators are continuously evolving to improve their ability to locate utilities under the ground or in other hidden areas. This locating is important for maintaining infrastructure as well as protecting human life during excavation.

As utility locators have evolved and increased in performance, the complexity of associated locating systems, devices, and methods has also increased. In many applications it may be ideal and/or even necessary for one or more utility locators to be used in a self-supported stationary and upright position, thereby allowing a user the freedom to work on other facets of a utility locating operation, such as collecting related data, controlling utility transmitter operation, interacting with a notebook computer, tablet device, smartphone, and the like.

In some applications, a user may further be required to continually transition between periods of positioning a utility locator device in a stationary self-supported upright orientation and carrying the utility locator device about the locate area. In other applications, such as in a traditional utility line locate operation, a user may mainly carry a utility locator throughout the entire locate operation while moving it through the air just above the ground.

Most existing utility locator devices are human supported and require a user to perform the inconvenient task of holding the utility locator device still and upright above the ground for lengthy periods of time during a locate operation. Some utility locator devices are configured to self-stand in an upright position, but they do so by permanently fixed mechanisms that are bulky and/or otherwise not ideal to be carried about during applications such as traditional line locate operations. Other existing utility locators configured to self-stand rely upon mechanisms that, when deployed, may be intrusive or bulky, thus preventing a user from safely carrying out tasks in order to complete the locate operation. Furthermore, many such self-supporting devices are configured to key to and/or otherwise secure to and function with utility locators have non-round masts, thus preventing their use with utility locators with round masts.

Accordingly, there is a need in the art to address the above-described as well as other problems.

SUMMARY

Embodiments of a self-standing attachment device in accordance with various aspects of the present disclosure address the aforementioned problems as well as others. Such self-standing attachment devices may include multiple legs detachably secured to a mast of a utility locator device. This allows the utility locator to self-stand in an upright position without being held or otherwise supported by a user, and allows the locator's sensors, such as magnetic field antennas, to be positioned above the ground surface similarly to the position they are normally held in by a user doing a traditional locate operation.

In exemplary embodiments, the self-standing attachment devices disclosed herein are tripod type devices; however they need not be. For example, some self-standing attachment device embodiments may have four or more legs as needed to adequately support a utility locator device, or, in some embodiments, fewer than three legs.

In one aspect, a self-standing attachment device may be readily attachable and detachable from a utility locator. The self-standing attachment device may snap or twist into and away from a mast of the locator, which may be a round mast or other shaped mast. In some embodiments the self-standing attachment device may couple to other elements of the locator, such as a frame, antenna balls or other housings, or other locator elements. When a utility locator device is seated within the self-standing attachment device, a series of clasps or other retaining mechanisms may secure the utility locator device to the self-standing attachment device, such as at an antenna node or other structure of the locator.

In another aspect, a self-standing attachment device may be stowable when secured to a utility locator device so that the self-standing attachment device is not a hindrance to a user when attached but not deployed. The legs of the self-standing attachment device may telescope outward for deployment, and may be readily retracted when not deployed. The legs may conveniently stow along antenna nodes located along the mast and away from interfering with a user's ability to use the utility locator in a standard locate operation.

Typical self-standing attachment device embodiments as described herein may be fully or largely made of non-ferromagnetic materials so that the attachment device doesn't interfere with signals coming to or from the utility locator. For example, magnetic field signals from buried utility lines received at the various antenna nodes of the locator may be received at antennas of the utility locator devices with minimal interference and attenuation by using non-ferromagnetic materials. Such self-standing attachment devices may likewise not impede other signals received or transmitted by a utility locator device, including, but not limited to, global position system (GPS) and/or other satellite navigation system signals received by modules in the locator, wireless communication signals to or from other locate system devices, signals captured by optical sensors, and/or other signal(s) associated with a utility locator system as described in the various incorporated patents and patent applications referenced herein.

In another aspect, a self-standing attachment device embodiment may be configured so that when deployed the device may be positioned so as to not to be intrusive to a user doing a standard locate operation. The legs on the self-standing attachment device may be arranged and positioned to allow a user to carry a utility locator device with attached self-standing attachment device while the self-standing attachment device is deployed in a normal and ergonomic manner. The legs and other components on the self-standing attachment device may be configured to minimize interference with a user's movements while carrying a deployed self-standing attachment device or otherwise interfere with use of the utility locator device.

In another aspect, a self-standing attachment device may include a top assembly. The top assembly may include a frame and a coupler for detachably coupling the attachment device to a mast of the buried utility locator. The attachment device may include a bottom assembly. The attachment device may include a plurality of leg assemblies. Ones of the plurality of leg assemblies may have a proximal end and a distal end. Each leg assembly may be coupled at the proximal end to the top assembly. Each leg assembly may be coupled to the bottom assembly. Each leg may be slidably coupled to the bottom assembly so as to allow the distal end of the leg assemblies to move inward and outward.

In another aspect, a buried utility locating system may include a buried utility locator and a detachably coupled self-standing attachment device embodiment such as is described subsequently herein.

Various additional aspects, features, devices, systems, and functionality are further described below in conjunction with the appended Drawings.

BRIEF DESCRIPTION OF THE DRAWINGS

The present application may be more fully appreciated in connection with the following detailed description taken in conjunction with the accompanying drawings, wherein.

DETAILED DESCRIPTION OF EMBODIMENTS

Overview

Figure 1A:
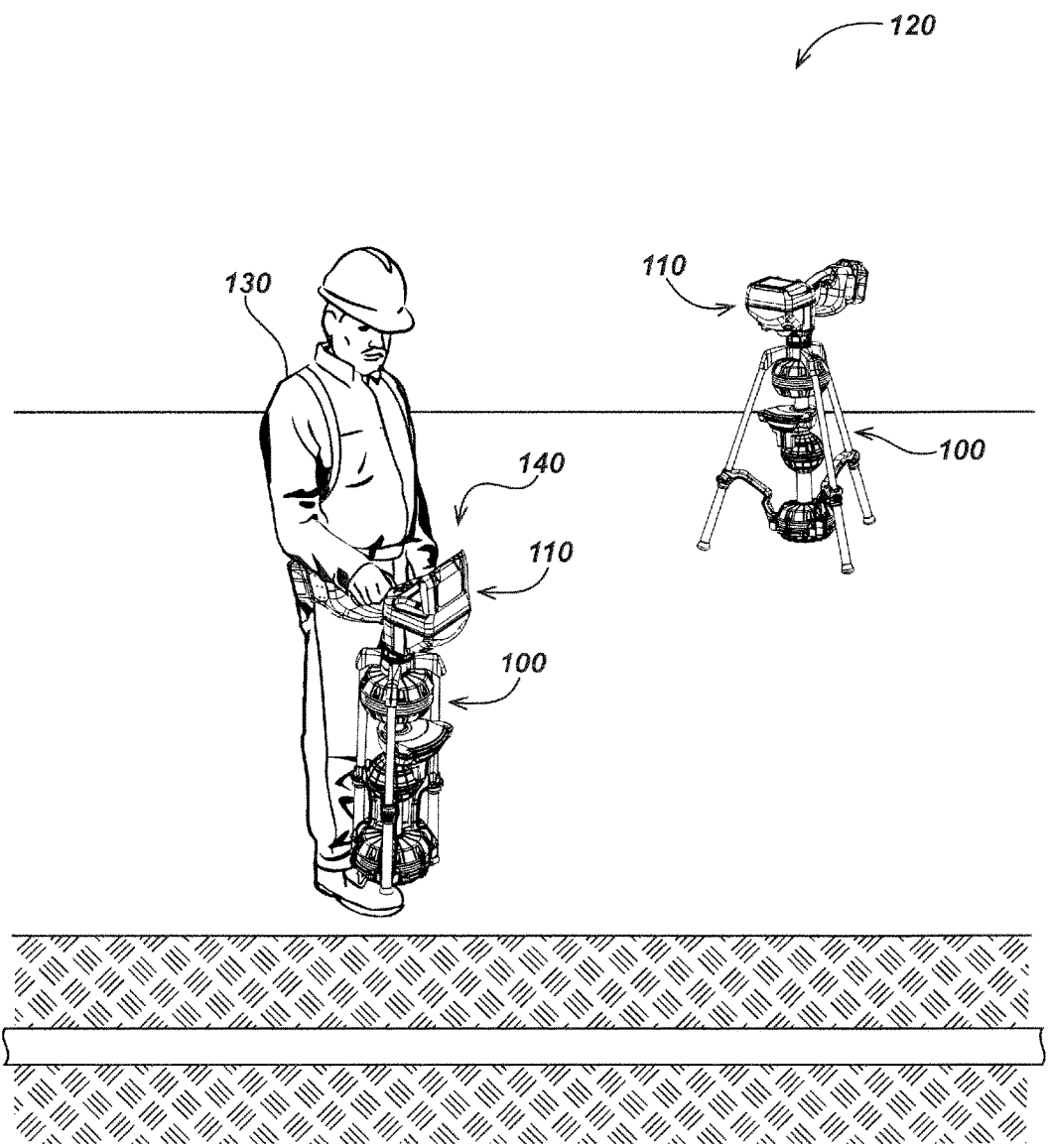
FIG. 1A includes illustrations of a self-standing attachment device embodiment in a deployed and self-supporting state as well as in a stowed and user-supported state.

This disclosure relates generally to utility locators and associated attachment devices that allow a utility locator to self-stand in an upright position without being held or otherwise supported by a user, as well as being stowable for transportation or for standard locate operations where it is carried and moved over the ground by a user.

As described herein, utility locator devices are electronic devices that determine information about buried or otherwise hidden or obscured utilities (e.g., conductive pipes or conduits, buried wires or other conductors, trace wires associated with buried pipes, and the like) by sensing magnetic fields emitted from the utilities.

Additional details of examples of utility locator devices (also referred to herein for brevity as "locators" or ULDs) that may be used in various embodiments in conjunction with the disclosures herein are described in co-assigned patent applications including: U.S. Pat. No. 7,009,399, issued Mar. 7, 2006, entitled OMNIDIRECTIONAL SONDE AND LINE LOCATOR; U.S. Pat. No. 7,276,910, issued Oct. 2, 2007, entitled A COMPACT SELF-TUNED ELECTRICAL RESONATOR FOR BURIED OBJECT LOCATOR APPLICATIONS; U.S. Pat. No. 7,288,929, issued Oct. 30, 2007, entitled INDUCTIVE CLAMP FOR APPLYING SIGNAL TO BURIED UTILITIES; U.S. Pat. No. 7,443,154, issued Oct. 28, 2008, entitled MULTI-SENSOR MAPPING OMNIDIRECTIONAL SONDE AND LINE LOCATOR; U.S. Pat. No. 7,518,374, issued Apr. 14, 2009, entitled RECONFIGURABLE PORTABLE LOCATOR EMPLOYING MULTIPLE SENSOR ARRAY HAVING FLEXIBLE NESTED ORTHOGONAL ANTENNAS; U.S. Pat. No. 7,619,516, issued Nov. 17, 2009, entitled SINGLE AND MULTI-TRACE OMNIDIRECTIONAL SONDE AND LINE LOCATORS AND TRANSMITTERS USED THEREWITH; U.S. Pat. No. 7,825,647, issued Nov. 2, 2010, entitled COMPACT LINE ILLUMINATOR FOR LOCATING BURIED PIPES AND CABLES; U.S. Pat. No. 7,990,151, issued Aug. 2, 2011, entitled TRI-POD BURIED LOCATOR SYSTEM; U.S. patent application Ser. No. 13/469,024, filed May 10, 2012, entitled BURIED OBJECT LOCATOR APPARATUS AND SYSTEMS; U.S. patent application Ser. No. 13/570,211, filed Aug. 8, 2012, entitled PHASE SYNCHRONIZED BURIED OBJECT LOCATOR APPARATUS, SYSTEMS, AND METHODS; U.S. Pat. No. 8,248,056, issued Aug. 21, 2012, entitled A BURIED OBJECT LOCATOR SYSTEM EMPLOYING AUTOMATED VIRTUAL DEPTH EVENT DETECTION AND SIGNALING; U.S. Pat. No. 8,264,226, issued Sep. 11, 2012, entitled SYSTEM AND METHOD FOR LOCATING BURIED PIPES AND CABLES WITH A MAN PORTABLE LOCATOR AND A TRANSMITTER IN A MESH NETWORK; U.S. patent application Ser. No. 13/676,989, filed Nov. 11, 2012, entitled QUAD-GRADIENT COILS FOR USE IN A LOCATING SYSTEM; U.S. patent application Ser. No. 13/851,951, filed Mar. 27, 2013, entitled DUAL ANTENNA SYSTEMS WITH VARIABLE POLARIZATION; and U.S. patent application Ser. No.

14/446,279, filed Jul. 29, 2014, entitled INDUCTIVE CLAMP DEVICES, SYSTEMS, AND METHODS. The content of each of these applications is incorporated by reference herein in its entirety. These applications may be referred to herein as the "incorporated applications."

In various applications and methods of use in a buried utility locate operation (also known as a "locate"), it may be advantageous to, at times, position a utility locator in a stationary self-supported upright position to collect measurements and/or allow a user/operator to perform other functions. At other times, it may be desirable for a user to carry the locator about the locate area and wave the locator around while either in a stationary position or moving across the ground (i.e., a traditional locate operation). In yet other applications, a user may find it advantageous to continually transition between short periods of positioning a utility locator device in a stationary self-supported upright orientation on the ground and carrying the utility locator device about the locate area (e.g., setting the locator on the ground for a period of time in a stationary position, lifting the locator up and moving to a second location, setting on the ground in the second location, lifting it up and moving it again, etc.).

To accommodate these applications and methods of use, as well as others, self-standing attachment device embodiments may be implemented as described subsequently herein in accordance with various aspect (and/or in combination with elements of locator systems as described in the incorporated applications) to be minimally intrusive to the user in various applications and methods of use.

For example, in one aspect, a self-standing attachment device embodiment may be readily attachable and detachable from a utility locator via a coupling mechanism. In one embodiment, the self-standing attachment device may snap or twist into and away from a mast of the locator, which may be a round mast in an exemplary embodiment. When a utility locator device is secured to the self-standing attachment device, a series of clips, clasps, snaps, nuts and bolts, or other retaining mechanisms may be used to secure the utility locator to the self-standing attachment device. This allows the user the benefit provided by a self-standing attachment device when desired, along with the choice of easily removing the device when it is not needed.

In another aspect, a self-standing attachment device may be stowable when secured to a utility locator device via, for example, extendable/retractable legs that fold outward near the ground for deployment and inward for storage. Other folding or retracting mechanisms may also be used in various embodiments. For example, the legs of the self-standing attachment device may telescope and thus extend for use and retract when not needed. The legs may conveniently stow along and/or be coupled with or snug against antenna nodes located along the mast so to not impede a user when the self-standing attachment device is attached but not deployed.

In another aspect, a self-standing attachment device may be configured so that when deployed the device is minimally intrusive to a user while being carried. For example, the positioning of the legs of the self-standing attachment device may allow a user to carry a utility locator device with attached self-standing attachment device while the self-standing attachment device is deployed, allowing user movement in a normal and unobstructed manner as is done with a traditional utility locator used in a standard locate operation.

In another aspect, a self-standing attachment device may include, for example, a top assembly. The top assembly may include a frame and a coupler for detachably coupling the attachment device to a mast of the buried utility locator. The attachment device may include a bottom assembly. The attachment device may include a plurality of leg assemblies. Ones of the plurality of leg assemblies may have a proximal end and a distal end. Each leg assembly may be coupled at the proximal end to the top assembly. Each leg assembly may be coupled to the bottom assembly. Each leg may be slidably coupled to the bottom assembly so as to allow the distal end of the leg assemblies to move inward and outward.

One or more of the top-assembly, bottom assembly, and leg assemblies may, for example, comprise all or substantially all non-ferromagnetic materials to reduce electromagnetic field distortion or attenuation.

The leg assemblies may, for example, be rotatably coupled to the top assembly. The leg assemblies may comprise telescoping leg elements. The plurality of leg assemblies may consist of three leg assemblies, where a first of the three leg assemblies may be a rear leg assembly. The rear leg assembly may be oriented towards the back when coupled to the locator. A second and a third of the three leg assemblies may be front leg assemblies. The front leg assemblies may be oriented towards the front of the locator when the locator is in a normal operating orientation. Ones of the plurality of leg assemblies may include a bottom leg and a top leg. The top leg may be sized with cross-sectional dimensions smaller than the bottom leg so at to slide thereinto. Conversely, the bottom leg may be sized with cross-sectional dimensions smaller than the top leg so as to slide thereinto. The top leg and the bottom leg may be circular or oval in cross-sectional. The top leg and bottom leg may be square or rectangular in cross-section. The top leg and bottom leg may be triangular in cross-section.

The top assembly may, for example, include a plurality of arms. The arms may extend outward from the center of the frame and may correspond to ones of a plurality of leg assemblies. The leg assemblies may be coupled to an outward-facing end of each arm with a joint or outer coupling mechanism. The top assembly may further include a rotation stop. The top assembly may include a plurality of retaining snap features.

The coupler may, for example, be positioned to attach to the buried utility locator at approximately the mid-point of a mast of the locator. The coupler may comprise an inwardly curved feature of the top assembly sized and shaped to detachably grip the mast of the buried utility locator. The coupler may comprise a clip element. The coupler may comprise a nut and bolt assembly. The coupler may comprise a latch element or assembly.

The bottom assembly may, for example, include a central section and a plurality of elongated leg links extending outward from the central section. Ones of the leg links may be coupled to ones of the leg assemblies. The bottom assembly may include a plurality of ring mount latches or other mating elements or attachment mechanisms to couple the bottom assembly to an antenna node of the locator. The bottom assembly is coupled to the leg assemblies near the distal end so as to position an antenna node of the buried utility locator near the ground when in a vertical upright orientation with the leg assemblies extended. The leg links may be coupled to the leg assemblies with a lockable/disengageable slide latch assembly or with other attachment mechanisms such as joints or pins. The leg link assemblies may include a section having a compacted U-shape conforming to a mast and/or an antenna ball outer shape. The central section of the bottom assembly may include a bottom ring mount shaped to partially or substantially fully surround and secure to an antenna node of the locator. The bottom ring mount may be circularly shaped and sized to surround the outside surface of the antenna node.

In another aspect, a buried utility locating system may include, for example, a buried utility locator and a self-standing attachment device detachably coupled thereto.

The attachment device may include, for example, a top assembly. The top assembly may include a frame and a coupler for detachably coupling the attachment device to a mast of the buried utility locator. The attachment device may include a bottom assembly. The attachment device may include a plurality of leg assemblies. Ones of the plurality of leg assemblies may have a proximal end and a distal end. Each leg assembly may be coupled at the proximal end to the top assembly. Each leg assembly may be coupled to the bottom assembly. Each leg may be slidably coupled to the bottom assembly so as to allow the distal end of the leg assemblies to move inward and outward. The buried utility locator may include a mast, and the coupler may removably attach to the mast. The mast may be a round mast, and the coupler may be in a circular shape, sized and dimensioned to the mast to flexibly attach by gripping around the mast.

One or more of the top-assembly, bottom assembly, and leg assemblies may, for example, comprise all or substantially all non-ferromagnetic materials to reduce electromagnetic field distortion or attenuation.

The leg assemblies may, for example, be rotatably coupled to the top assembly. The leg assemblies may comprise telescoping leg elements. The plurality of leg assemblies may consist of three leg assemblies, where a first of the three leg assemblies may be a rear leg assembly. The rear leg assembly may be oriented towards the back when coupled to the locator. A second and a third of the three leg assemblies may be front leg assemblies. The front leg assemblies may be oriented towards the front of the locator when the locator is in a normal operating orientation. Ones of the plurality of leg assemblies may include a bottom leg and a top leg. The top leg may be sized with cross-sectional dimensions smaller than the bottom leg so at to slide thereinto. Conversely, the bottom leg may be sized with cross-sectional dimensions smaller than the top leg so as to slide thereinto. The top leg and the bottom leg may be circular or oval in cross-sectional. The top leg and bottom leg may be square or rectangular in cross-section. The top leg and bottom leg may be triangular in cross-section.

The top assembly may, for example, include a plurality of arms. The arms may extend outward from the center of the frame and may correspond to ones of a plurality of leg assemblies. The leg assemblies may be coupled to an outward-facing end of each arm with a joint or outer coupling mechanism. The top assembly may further include a rotation stop. The top assembly may include a plurality of retaining snap features.

The coupler may, for example, be positioned to attach to the buried utility locator at approximately the mid-point of a mast of the locator. The coupler may comprise an inwardly curved feature of the top assembly sized and shaped to detachably grip the mast of the buried utility locator. The coupler may comprise a clip element. The coupler may comprise a nut and bolt assembly. The coupler may comprise a latch element or assembly.

The bottom assembly may, for example, include a central section and a plurality of elongated leg links extending outward from the central section. Ones of the leg links may be coupled to ones of the leg assemblies. The bottom assembly may include a plurality of ring mount latches or other mating elements or attachment mechanisms to couple the bottom assembly to an antenna node of the locator. The bottom assembly is coupled to the leg assemblies near the distal end so as to position an antenna node of the buried utility locator near the ground when in a vertical upright orientation with the leg assemblies extended. The leg links may be coupled to the leg assemblies with a lockable/disengageable slide latch assembly or with other attachment mechanisms such as joints or pins. The leg link assemblies may include a section having a compacted U-shape conforming to a mast and/or an antenna ball outer shape. The central section of the bottom assembly may include a bottom ring mount shaped to partially or substantially fully surround and secure to an antenna node of the locator. The bottom ring mount may be circularly shaped and sized to surround the outside surface of the antenna node.

The following exemplary embodiments are provided for the purpose of illustrating examples of various aspects, details, and functions of the present disclosure; however, the described embodiments are not intended to be in any way limiting. It will be apparent to one of ordinary skill in the art that various aspects may be implemented in other embodiments and configurations within the spirit and scope of the present disclosure.

Various additional aspects, features, and functions are described below in conjunction with FIGS. 1A through 7 of the appended drawing figures.

Example Self-Standing Attachment Device Embodiments for Utility Locators

FIG. 1A illustrates details of an embodiment 100 of a system including a self-standing attachment device coupled to a utility locator 110. As illustrated in FIG. 1A, self-standing attachment device 100 may be configured to deploy and allow utility locator 110, seated and secured thereto, to self-support in an upright position for use or storage. This is shown in the background to the right (position or state 120) in FIG. 1A, where the self-standing attachment device 100 and locator 110 is shown in a deployed and self-supported state. Such a deployed and self-supported state 120 may be used in various utility mapping and excavating operations, as well as with line locating operations. For example, one or more utility locators 110 in a deployed and self-supported state 120 may be placed in and remain stationary in order to track and map other system devices such as a pipe sonde (not illustrated) as it is moved through a pipe, and/or a horizontal drilling device (not illustrated) as it bores a hole through the earth.

In yet other uses, the system including attachment device 100 and locator 110 may be carried by a user 130 in a stowed and user-supported state 140 as shown toward the front left in FIG. 1A. When in a stowed and user-supported state 140, the self-standing attachment device 100 may be configured to be relatively unobtrusive to the operation of the utility locator device 110 by the user 130 so that the user can use the locator in a normal locate operating mode by moving it over the ground surface.

Figure 1B:
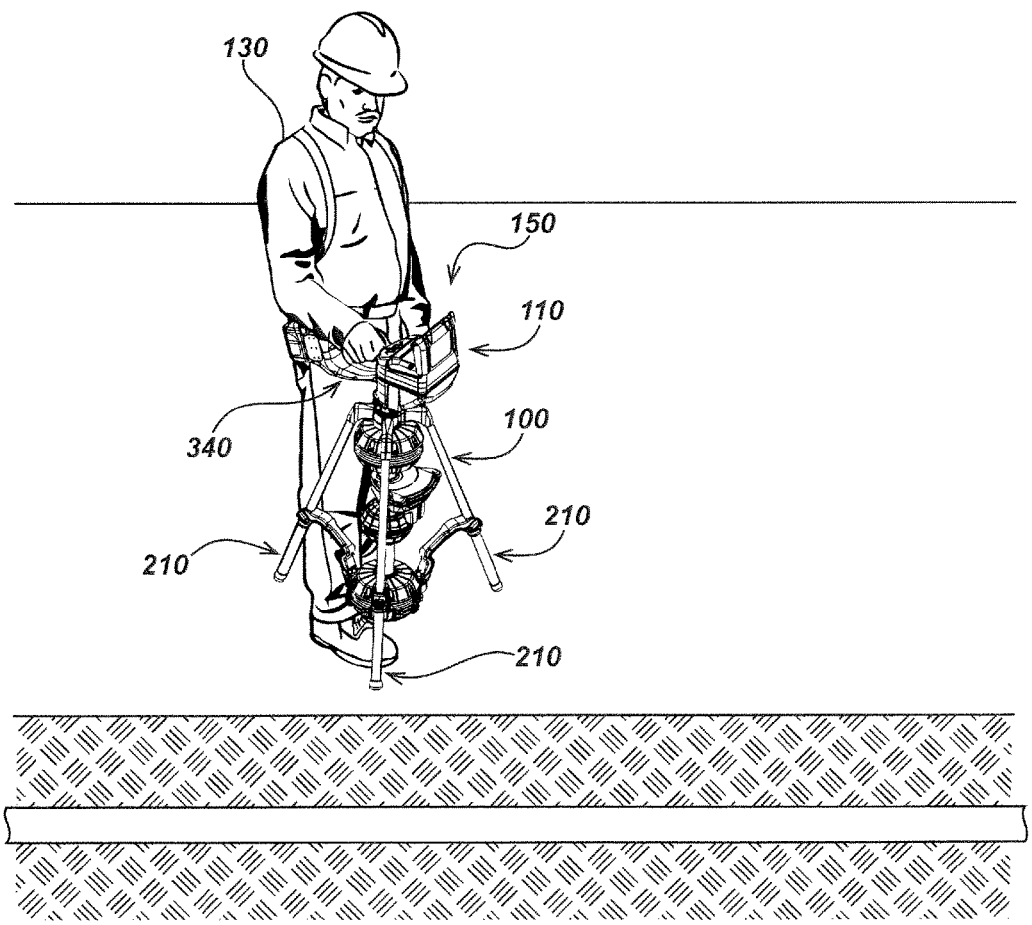
FIG. 1B is an illustration of the self-standing attachment device embodiment of FIG. 1A in a deployed and user-supported state.
Figure 1C:
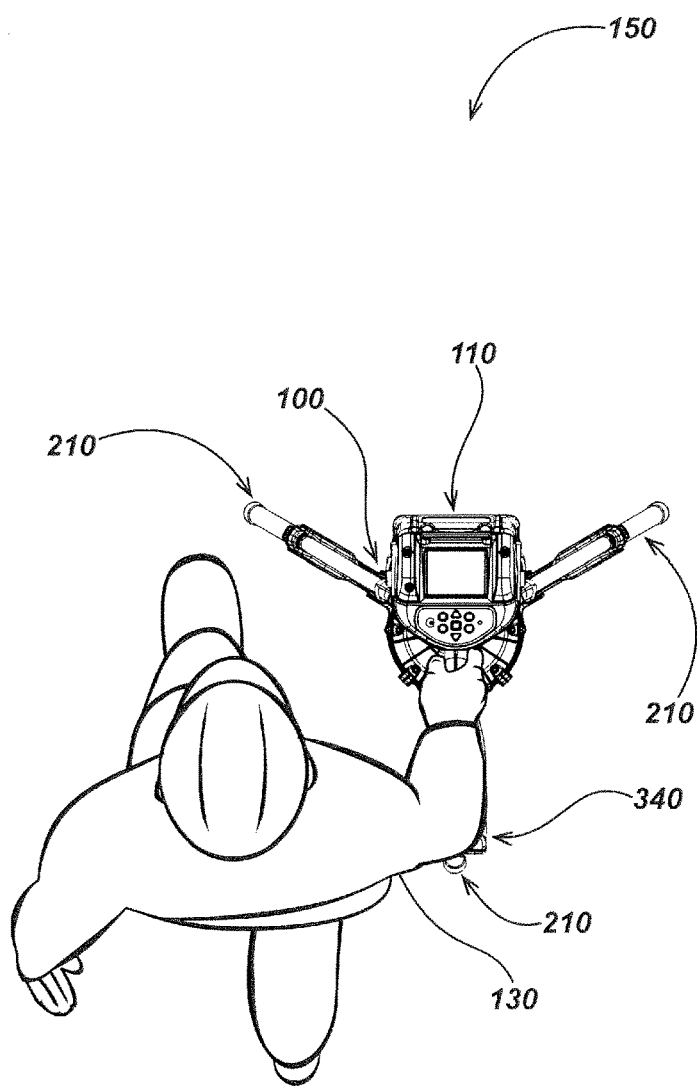
FIG. 1C is a top view illustration looking down on a user performing an example locate operation with the self-standing attachment device embodiment of FIG. 1A.

Turning to FIGS. 1B and 1C, in further uses, the system may be carried by a user 130 in a deployed and user-supported state 150. In state 150, the self-standing attachment device 100 allows the user 130 to unobtrusively transition between periods of positioning a utility locator device 110 in a self-supported upright orientation, such as illustrated in state 120 of FIG. 1A, and carrying the utility locator 110 about the locate area and moving it over the ground as in a traditional locate operation.

The leg assemblies 210 (FIGS. 2A and 2B) may be positioned such that each leg assembly 210 (FIGS. 2A and 2B) minimizes obstruction of a user 130's movements while carrying the utility locator device 110. For example, as shown in FIG. 1C, the self-standing attachment device 100 may have a tripodal leg configuration with two front-facing leg assemblies ("front leg assembly") 210 and one rear-facing leg assembly ("rear leg assembly") 210. The front and rear orientations refer to the relative positioning of the legs when the attached locator is held by a user in a standard locate operation orientation as shown in FIG. 1C, with forward being the direction of forward movement of the user (i.e., towards the top of the page as shown in FIG. 1C), and rearward being the direction facing the user (i.e., towards the bottom of the page as shown in FIG. 1C).

By positioning the leg assemblies so that two legs of the attachment device 100 are on the front when the locator is coupled to it and one leg is on the rear, it will be less likely that the legs will interfere with the user's legs as the user is walking while performing a locate. For example, the rear facing leg assembly 210 may be positioned to align with a handle assembly 340 on the utility locator device 110 such that when user 130 grasps the handle assembly 340 on the utility locator device 110 and carries the utility locator device 110 about their side, the rear facing leg assembly 210 may also be situated about the user's side (e.g., to the user's right side as shown in FIG. 1C). The front leg assemblies 210 may be positioned in a slight forward orientation so as to further allow the user's 130 legs to move freely and unobstructed while carrying utility locator device 110 and moving forward or backward with it.

Referring to FIGS. 1A-1C, various embodiment of self-standing attachment devices, including the example self-standing attachment device embodiment 100 as shown, may fully or largely comprise non-ferromagnetic materials so that the self-standing attachment device 100 does not interfere with magnetic field signals to and from the utility locator 110. For example, non-ferrous materials may be used in the attachment device so that magnetic field signals from buried utility lines received at the various magnetic field antenna nodes of the locator, such as omnidirectional magnetic field antenna nodes 240, 250, and 260 (FIGS. 2A and 2B), are minimally attenuated or distorted. Use of non-ferromagnetic materials may further aid in reducing interference with other signals received or transmitted by the utility locator device 110, including but not limited to, global position system (GPS) and/or other satellite navigation system signals, wireless communication signals to or from other system devices, signals captured by other sensors, and/or other signal(s) used with a utility locator device as described in the various aforementioned incorporated patents and patent applications.

Figure 2A:
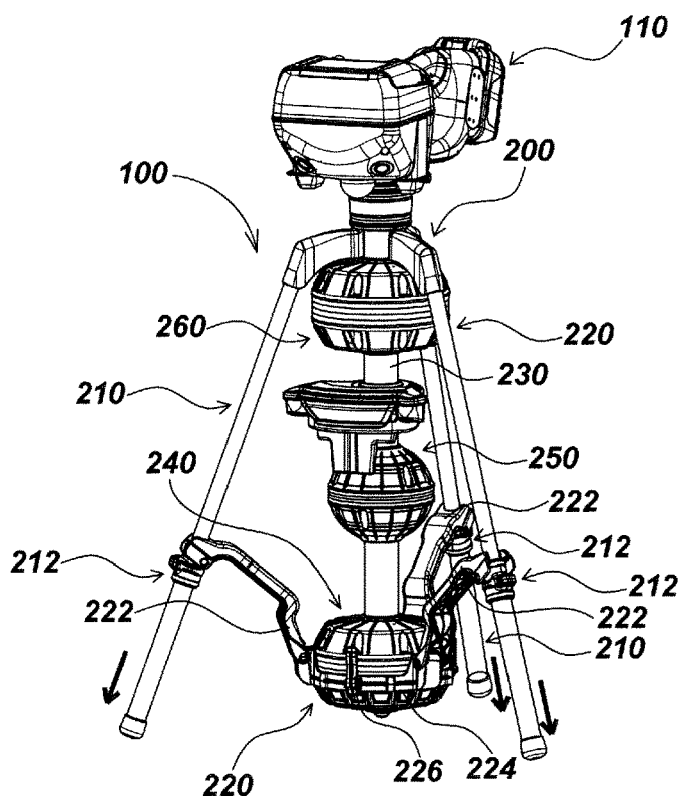
FIG. 2A is a detailed illustration of a utility locator device with a coupled self-standing attachment device embodiment in a deployed state.
Figure 2B:
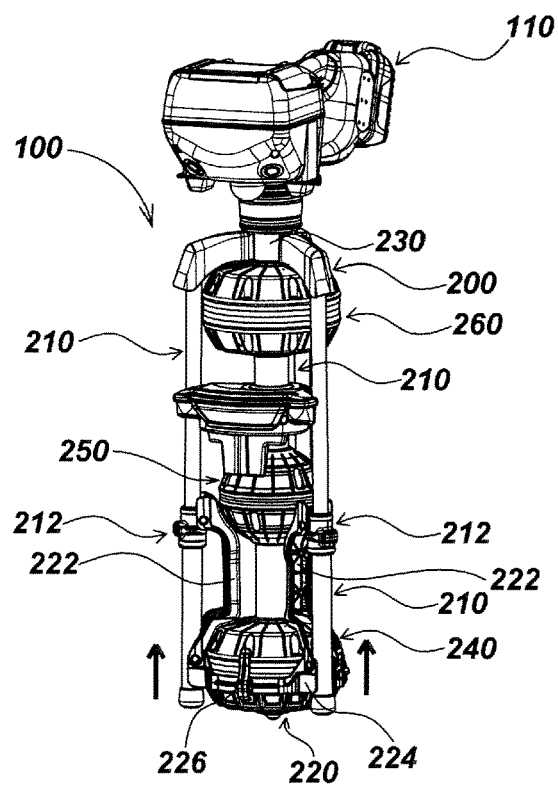
FIG. 2B illustrates the utility locator device and coupled self-standing attachment device embodiment of FIG. 2A in a stowed state.

FIGS. 2A and 2B illustrate additional details of the attachment device embodiment 100. For example, attachment device 100 may include a top assembly 200, a bottom assembly 220, and multiple leg assemblies 210, with each leg assembly having a proximal end 213 and a distal end 211. Each leg assembly 210 may be rotatably coupled to the top assembly 200 at the proximal end 213, and slidably coupled to the bottom assembly 220. In an exemplary embodiment three leg assemblies are used; however, fewer or more leg assemblies may be used in alternate embodiments.

The leg assemblies 210 may be coupled between the top assembly 200 and the bottom assembly 220 so that the top assembly and proximal ends of the leg assemblies are positioned near the top of the attachment device when oriented upright on the ground surface (as shown in FIG. 2A), and the bottom assembly is positioned near the ground surface so as to restrain the distal end 211 of the leg assemblies from radial outward movement over the ground surface beyond a desired distance.

Figure 3:
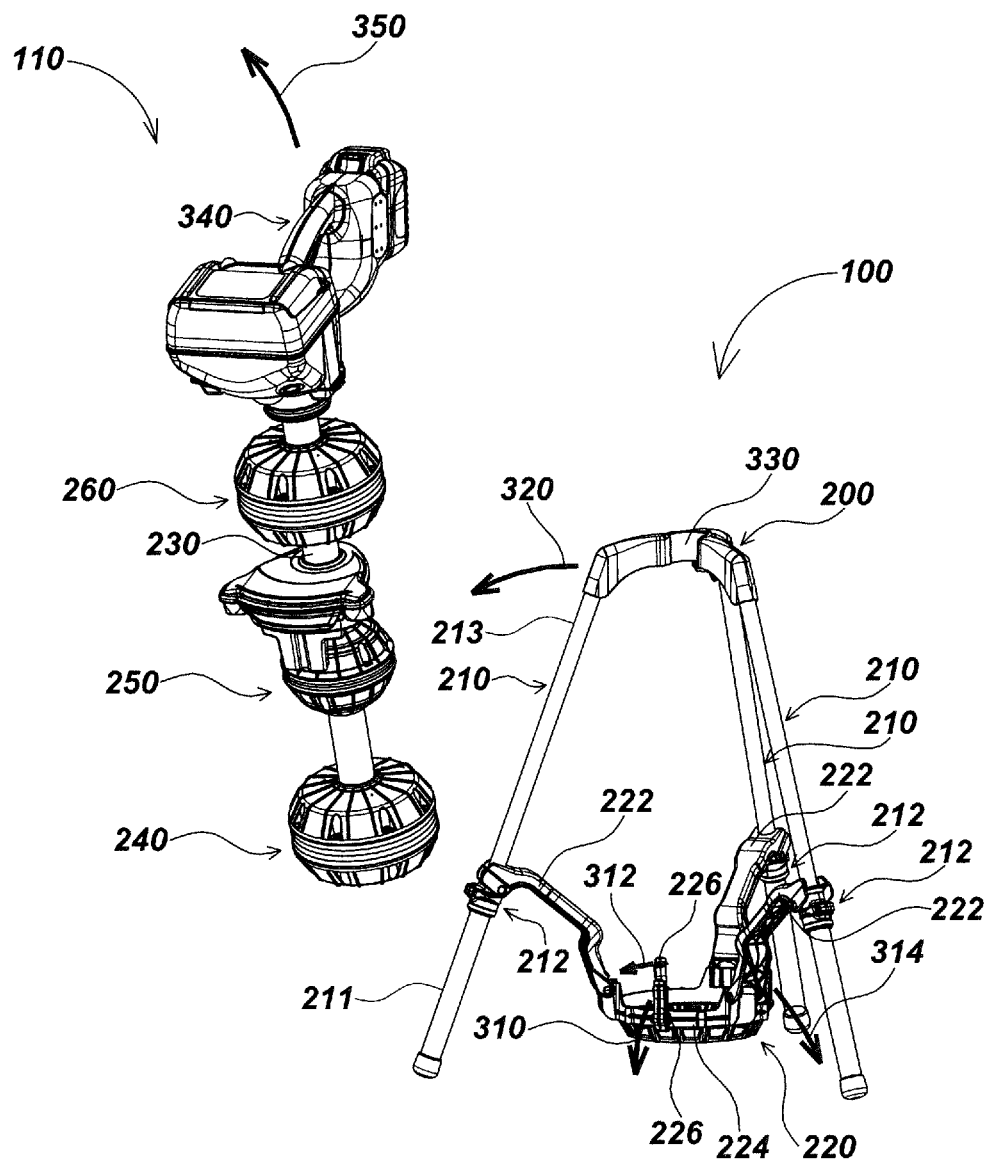
FIG. 3 illustrates an example of detachment of a utility locator device from a self-standing attachment device.

The top assembly 200 may include a frame and an integral or attached coupler, such as a formed feature, snap or clip element, bolts and nuts, latches, or other coupling elements (not shown), to detachably couple the top assembly 200 to the locator. In an exemplary embodiment, the top assembly is coupled to the locator at round mast 230; however, it may be coupled to other elements of the locator in alternate embodiments. The top assembly 200 may be attached to the mast 230 at approximately the mid-point of the mast as shown in FIG. 3. In an exemplary embodiment, the coupler, in the form of a partially flexible curved feature 330 in a central section of the top assembly (as shown in FIG. 3) may be shaped or formed to flexibly grip the mast but allow a user to snap the top assembly onto and off of the mast by applying a pulling or flexing motion.

The curved feature 330 may be sized and shaped to conform to the corresponding cross-sectional shape of the locator mast to allow secure attachment, while readily allowing snap on and twist or pull off coupling to the locator mast. Other couplers, such as snaps, clips, bolts and nuts, and the like may also be used to attach the top assembly to the locator at various positions. In alternative embodiments, the shape and dimensions of the top assembly and associated couplers may be varied to accommodate masts of other shapes and dimensions. For example, for square or rectangular cross-sectioned masts the coupler may be a corresponding square or rectangular shaped section or feature of the top assembly. Other attachment mechanisms, such as clips, nuts and bolts, latches, and the like, may also be used to couple the attachment device to the locator in alternate embodiments.

The top assembly 200 may include a frame having a central section which a coupler may be integral with or attached to, and a plurality of arms extending outward from the central section. The top assembly 200 may be rotatably coupled to the top of each leg assembly 210 such that the proximal end 213 of each leg assembly 210 is spaced about corresponding outward extending arms of the top assembly 200 in a tripod leg configuration to allow the legs to rotate outward from or inward to the top assembly. As noted previously, other embodiments may use fewer or more leg assemblies (for example, two leg assemblies may be used in certain embodiments where additional support is available for the locator or combined locator/attachment device, or four or more legs may be used in other embodiments to provide additional stability, etc.), and the top assembly in such embodiments may have corresponding fewer or more outward extending arms.

The top assembly 200 and each leg assembly 210 may be rotatably coupled at a joint, allowing angular radial outward and inward movements (relative to a central vertical axis of the attachment assembly when positioned in a vertically upright position as shown in FIG. 3) of the distal end of each leg assembly 210. Further details of an exemplary embodiment of a top assembly are illustrated and described with respect to FIG. 4.

The bottom assembly 220 may include a central section and a plurality of leg links corresponding to the plurality of leg assemblies. The bottom assembly may be slidably attached to each of the leg assemblies to allow the legs to move inward for storage/transportation or outward for use on the ground. For example, each leg assembly 210 may be slidably coupled with a lockable/disengageable slide latch assembly 212 to the leg assemblies to secure the leg assemblies to the bottom assembly 220 via elongated leg links 222.

The slide latch assemblies 212, when disengaged, may allow telescoping of the leg assemblies 210 during deploying and stowing of the self-standing attachment device 100, and may then be locked to restrain the legs from moving once they are oriented in a desired position. Each leg link 222 may form a joint where connected to the slide latch assembly 212 on one end and the central section, for example to a bottom ring 224 comprising the central section of the bottom assembly 220, further allowing angular outward and inward tripodal movements of the leg assemblies 210.

The bottom ring mount 224 may be sized and shaped to surround and seat to a lower antenna node 240 on the utility locator device 110, and may secure thereto via ring mount latches 226 or other coupling mechanisms. In an exemplary embodiment, the lower antenna node is in a spherical shape, and the bottom ring mount is formed in a ring shape and sized to fit snugly around the outside of the node. Other shapes and sizes may be used in alternate embodiments to secure the ring mount to the size and shape of corresponding antenna nodes or other locator elements, such as masts, etc.

Each leg link 222 may be shaped such that when the self-standing attachment device 100 is in a stowed state as illustrated in FIG. 2B, the contour of the leg links 222 conform to the shape of the utility locator device 110 along the lower antenna node 240, middle antenna node 250, and/or mast 230. For example, on a locator with antenna balls as shown in FIG. 2A and FIG. 2B, the leg links 222 may be in a compacted U-shape as shown to conform to the mast and curvature of the antenna balls. A gap may be formed between each leg assembly 210 and the portion of each leg link 222 formed to seat along the mast 230 when the self-standing attachment device 100 is in a stowed state as illustrated in FIG. 2B. This gap may be dimensioned to accommodate a user's hand (not illustrated) such that when the self-standing attachment device 100 is transitioned from the stowed state as illustrated in FIG. 2B to the deployed state illustrated in FIG. 2A, a user (not illustrated) may grasp the leg assemblies 210, fitting a hand through the gap between the leg assembly 222 and leg link 222, and pull outward, thereby extending each leg assembly 210 out into the deployed state as illustrated in FIG. 2A. Further details of an exemplary embodiment of a bottom assembly are illustrated and described with respect to FIG. 7.

When the self-standing attachment device 100 is in coupled to the utility locator device 110 and in a deployed state as illustrated in FIG. 2A, an outward pulling action on the leg links 222, coupled to both the slide latch assemblies 212 and bottom ring mount 224, causes the leg assemblies 210 to extend outward. The outward extension of the leg assemblies 210 may, in turn, cause the bottom ring mount 224 seating the lower antenna node 240 of the utility locator device 110 to elevate the lower antenna node 240 to position it off the ground surface. Conversely, when the self-standing attachment device 100 is returned to a stowed state, as illustrated in FIG. 2B, movement of the leg links 222 cause the leg assemblies 210 to retract inward. The inward retraction of the leg assemblies 210 may, in turn, allow the leg assemblies 210 and overall self-standing attachment device 100 to stow closely and unobtrusively in towards the lower antenna node 240, middle antenna node 250, and/or top antenna node 260 located on the mast 230 of the utility locator device 110.

In an exemplary embodiment, the attachment device is readily attachable to and removable from an associated utility locator. For example, turning to FIG. 3, when removing the utility locator device 110 from the self-standing attachment device 100, a user (not illustrated in FIG. 3) may first release the attachment device from the lower end of the locator, for example by releasing each of the ring mount latches 226 of the bottom assembly 220. Release of ring mount latches 226 may be accomplished by applying force about the top of each ring mount latch 226 along directions analogous to that of directions 310, 312, and 314, thus freeing the lower antenna node 240 from the bottom ring mount 224 of the bottom assembly 220.

Once each ring mount latch 226 has been undone, thereby freeing the lower antenna node 240 from the bottom ring mount 224, a user (not illustrated) may rotate and/or lever the top the utility locator device 110 along a direction analogous to direction 320 with sufficient force to unsnap and free the mast 230 of the utility locator device 110 from a coupler, such as mast retaining feature 330 formed on the top assembly 200. Other release mechanisms, such as snaps, latches, screws, and the like may alternately be used in some embodiments.

Release force may generally be applied by a user (not illustrated) by grasping handle assembly 340 on the utility locator device 110 and rotating the utility locator 110 along direction 320. The user may then pull the utility locator device 110 in a direction, such as direction 350, out and away from the self-standing attachment device 100. Once the utility locator device 110 has been removed from the self-standing attachment device 100, leg assemblies 210, which may be telescoping, may be retracted, for example by applying compressing force along the top and bottom of the self-standing attachment device 100 to further compact the self-standing attachment device 100 for increased compactness and storability. The leg assemblies may be extended in a reverse operation during use.

Figure 4:
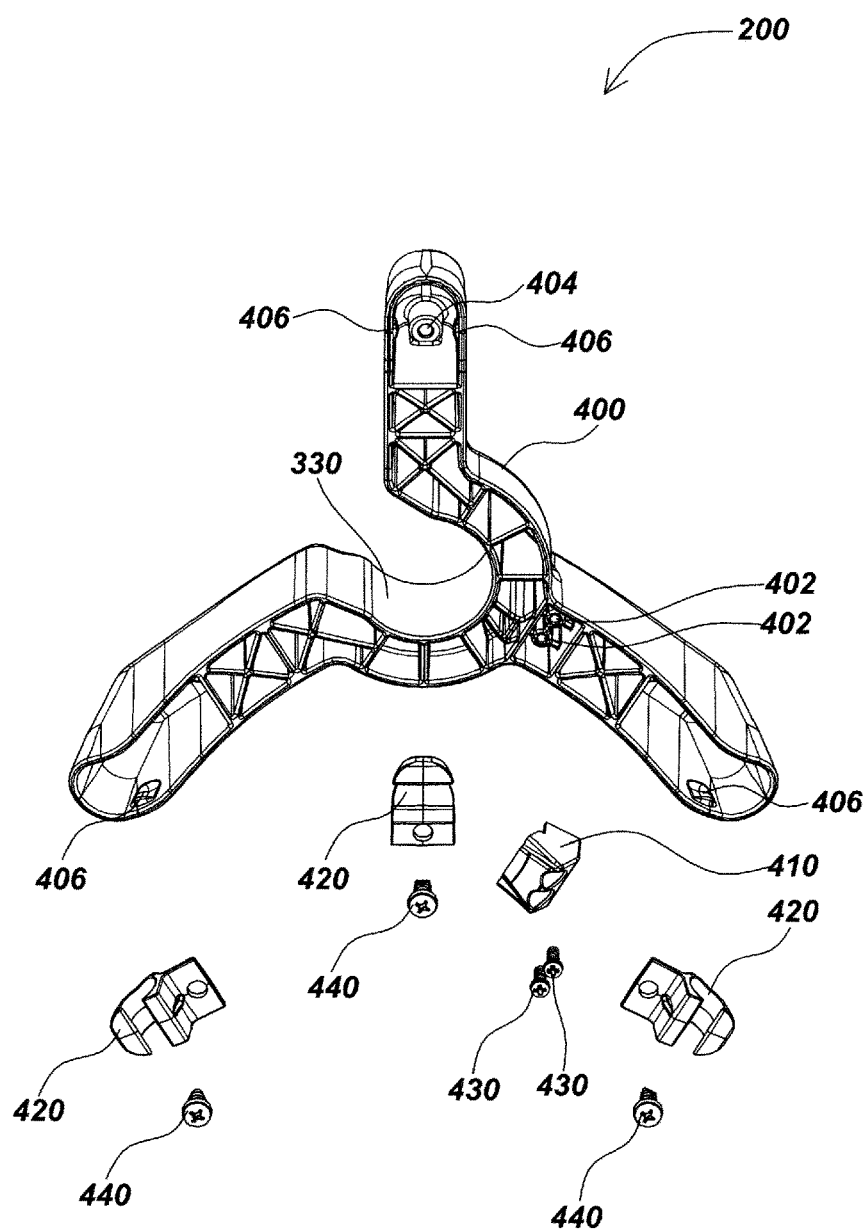
FIG. 4 is an exploded view illustrating details of a top assembly embodiment.

Turning to FIG. 4, additional details of exemplary top assembly embodiment 200 are illustrated. As shown in FIG. 4, top assembly 200 may include a top frame 400, which may include an integral or attached coupler. In the illustrated embodiment, the coupler is in the form of a mast retaining feature 330 (or may alternately be in the form of other coupling elements such as snaps, latches, bolts and nuts, and the like) and three outward extending arms. In the exemplary embodiment shown, the top frame is formed in a triangularly outlined shape with three elongated outward extending arms and a central curved retaining feature for gripping a corresponding locator; however, other shapes may be used in alternate embodiments.

The top assembly may further include a top rotation stop 410 and a set of three top leg joints 420 coupled to or integral with the frame to allow the leg assemblies to rotate relative to the top assembly. The mast retaining feature 330 formed on top frame 400 may be sized and shaped to couple to the mast 230 (FIG. 2A) of the utility locator device (FIG. 2A) such that the mast 230 (FIG. 2A) snaps into and seats snugly within mast retaining feature 330, while being releasable with a corresponding reverse action. The top rotation stop 410 may secure to the bottom side of the top frame 400 near the mast retaining feature 330. A set of screws 440 may be used to secure the top rotation stop 410 to the bottom of the top frame 400 via rotation stop screw hole features 402, which may be formed along the bottom of top frame 400. In use, the top rotation stop 410 may contact and key to the top antenna node 260 (FIG. 2A) on utility locator 110 (FIG. 2A) and prevent unwanted rotations of the utility locator when secured within the self-standing attachment device 100.

Still referring to FIG. 4, each top leg joint 420 may seat within the bottom and along the outer dimensions of the arms of top frame 400. A screw 440 or other attachment mechanism may be used to secure each of the top leg joints 420 in place within the top frame 400 via a leg joint screw hole feature 404 (partially obscured in FIG. 4) formed along the bottom of the top frame 400. A series of retaining snap features 406 (partially obscured in FIG. 4) formed within the bottom and along the outer dimensions of the arms of top frame 400 near each top leg joint 420 may allow the leg assembly 210 (FIG. 2A) to snap in and out of position when going from a stowed to deployed state, and vice versa, and may further hold each leg assembly 210 (FIGS. 2A and 2B) more firmly in place when the self-standing attachment device 100 (FIGS. 2A and 2B) is in a deployed state.

Figure 5:
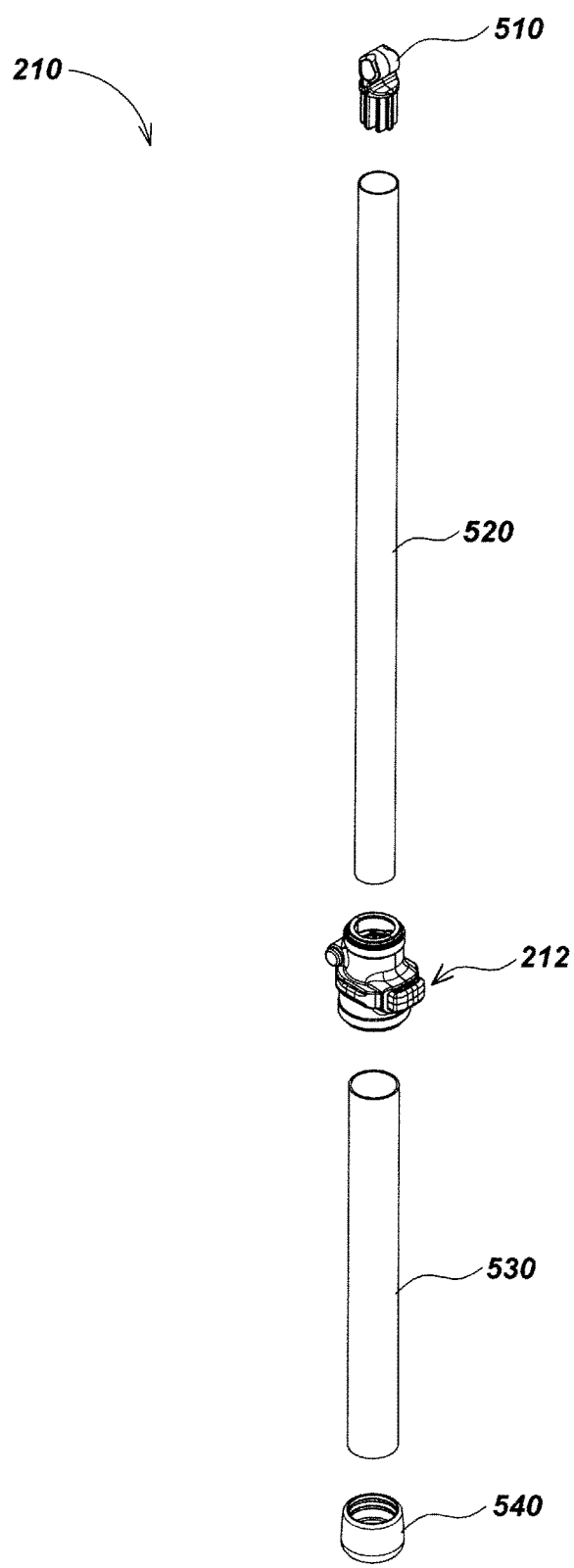
FIG. 5 is an exploded view illustrating details of a leg assembly embodiment.

Turning to FIG. 5, details of an exemplary embodiment of a leg assembly are illustrated. Although leg assemblies may include different numbers of leg elements and joints or connections, in an exemplary embodiment, each leg assembly 210 is comprised of a leg joint 510, a top leg 520, which in an exemplary embodiment is cylindrical, a slide latch assembly 212, a bottom leg 530, which may also be cylindrical, and a foot 540. The leg joint 510 may seat snugly within the top end of the top leg 520 on one end and within one of the top leg joints 420 (FIG. 4) of the top assembly 200 (as shown in FIG. 4) on the other. Each leg joint 510 may connect to the top leg joint 420 so as to form a joint allowing the leg assemblies 210 to move outward and inward between stowed and deployed states.

Still referring to FIG. 5, top leg 520 may secure to the slide latch assembly 212 which may further secure to the cylindrical bottom leg 530. The top leg 520 and bottom leg 530 may be dimensioned with the top leg smaller than the bottom leg so that that when the slide latch assembly 212 is disengaged, the top leg 520 slides within the bottom leg 530. This configuration may be used to provide telescoping of the leg assemblies 210 when the self-standing attachment device 100 is transitioned from a deployed to a stowed state, and vice versa. The foot 540 may secure about the bottom of the bottom leg 530.

Figure 6A:
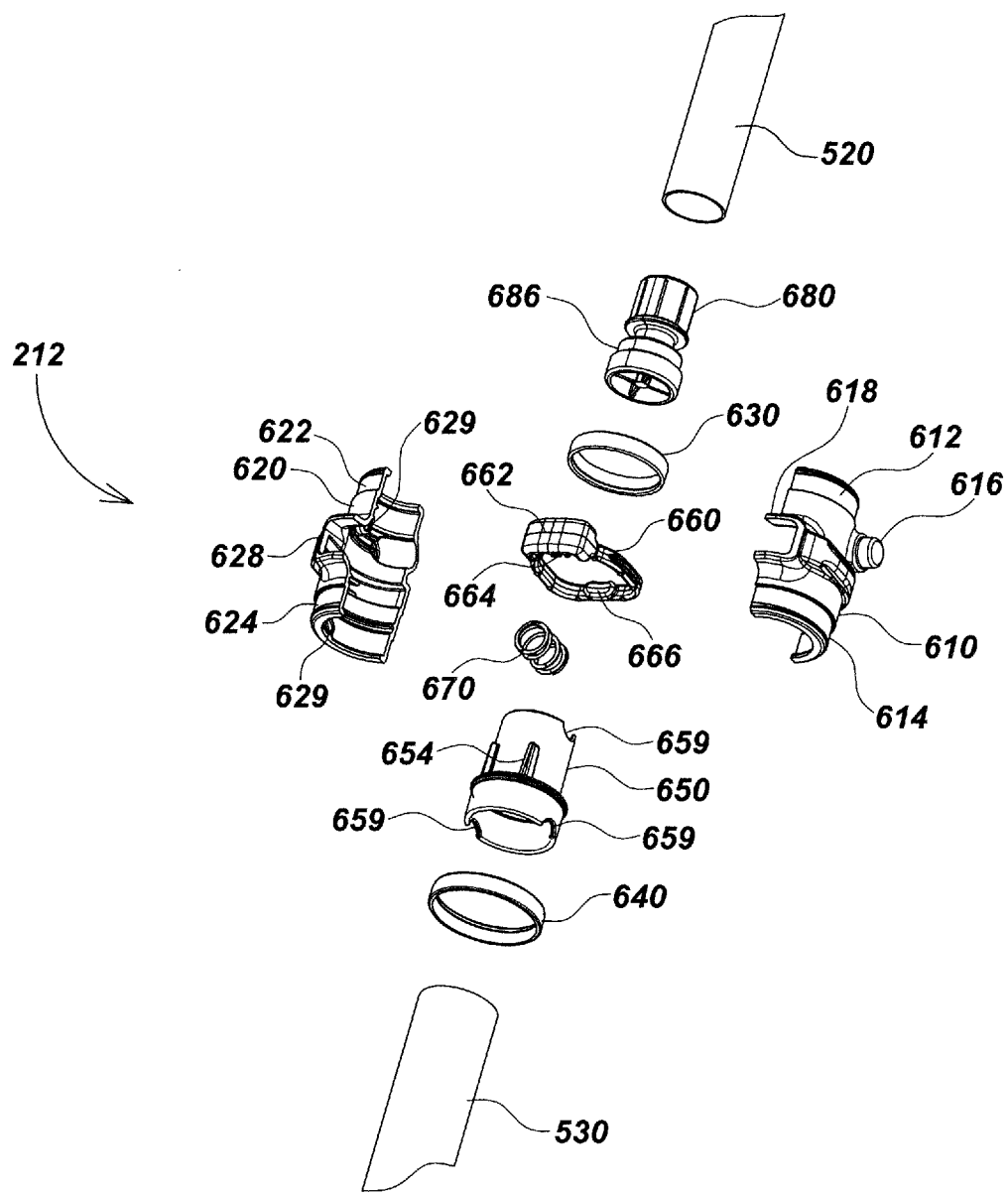
FIG. 6A is an exploded view illustrating details of a slide latch assembly embodiment, as well as a portion of the top and bottom leg of a leg assembly embodiment.

Turning to FIG. 6A, details of an exemplary embodiment of a slide latch assembly are illustrated. Slide latch assembly 212 may comprise a latch right shell half 610 and a latch left shell half 620 which, in assembly, may secure together via a top ring retainer 630 and a bottom ring retainer 640. The top ring retainer 630 may snap into a groove formed in assembly of a right top groove half 612 formed on the top of the latch right shell half 610, and a left top groove half 622 formed along the top of the latch left shell half 620. Similarly, the bottom ring retainer 640 may snap into a groove formed in assembly of a right bottom groove half 614 formed on the bottom of the latch right shell half 610, and a left bottom groove half 624 formed along the bottom of the latch left shell half 620.

Figure 6B:
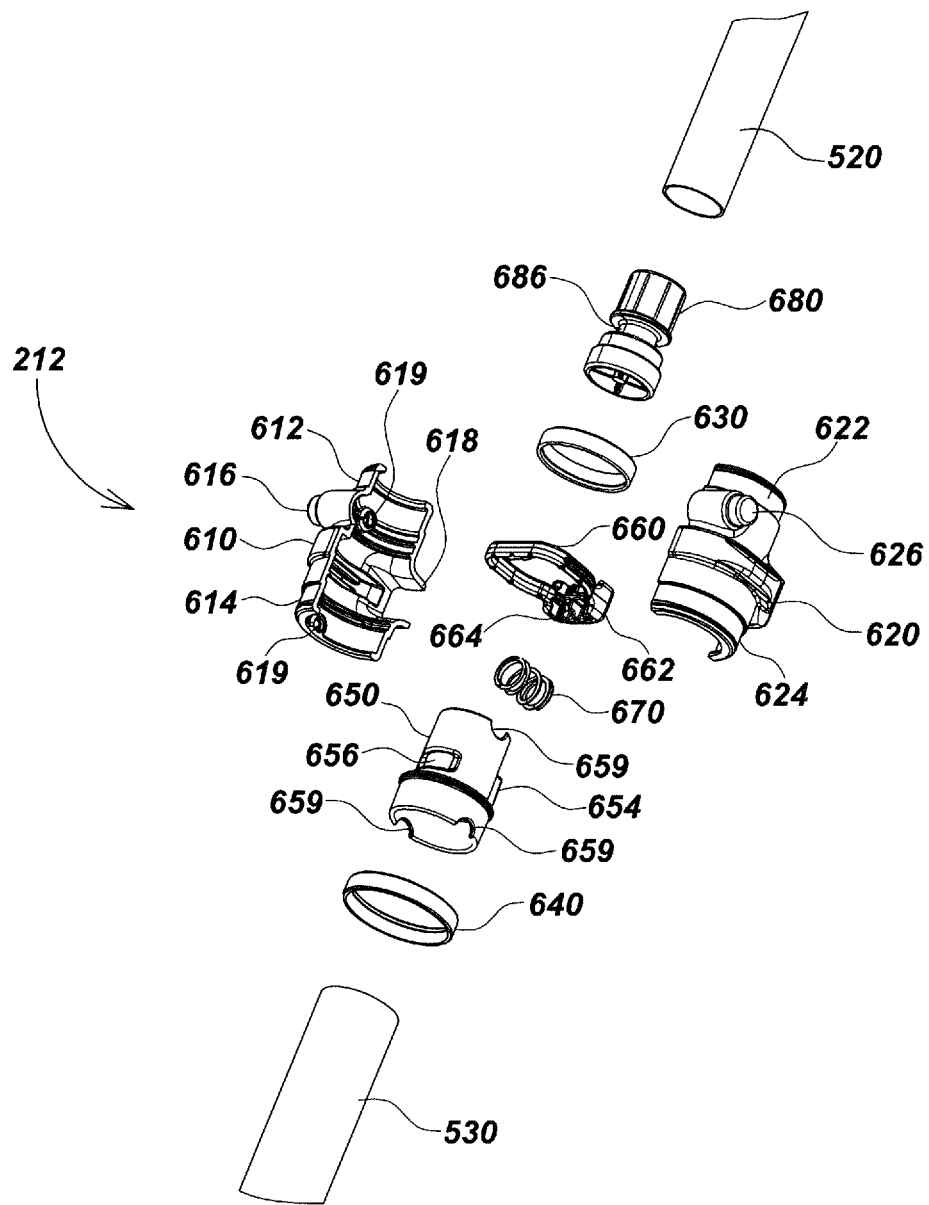
FIG. 6B is an exploded view illustrating details of the back of a slide latch assembly embodiment, as well as a portion of the top and bottom legs of a leg assembly embodiment.

The latch right shell half 610 and latch left shell half 620 may further each be formed with a right leg link retaining pin 616 and a left leg link retaining pin 626 (FIG. 6B), respectively. In assembly, leg link 222 (FIGS. 2A and 2B) of the bottom assembly 220 (FIGS. 2A and 2B) may secure to the slide latch assembly 212 via right leg link retaining pin 616 and left leg link retaining pin 626 (FIG. 6B) such that the leg link 222 (FIGS. 2A and 2B) may pivot about an axis formed by each paired set of right leg link retaining pin 616 and left leg link retaining pin 626 (FIG. 6B).

Still referring to FIG. 6A, the slide latch assembly 212 may further comprise a latch stop 650, which may be largely cylindrical, a button 660, a spring 670, and a locking support 680, which may also be largely cylindrical. With the exception of a push-button surface 662 formed on the button 660 and made to extend through a hole formed in assembly of a right gap feature 618 and left gap feature 628 formed on the latch right shell half 610 and latch left shell half 620 respectively, the latch stop 650, button 660, and spring 670 may all secure within the assembly of the latch right shell half 610 and latch left shell half 620.

Latch stop 650 may be formed with a series of latch groove features 659 configured to key to a series of right anti-rotation pin features 619 (FIG. 6B) and left anti-rotation pin features 629 formed within the latch shell right and left halves 610 and 620 respectively. In assembly, the keying of latch groove features 659 on the latch stop 650 to right anti-rotation pin features 619 (FIG. 6B) of the latch right shell half 610 and left anti-rotation pin features 629 of the latch left shell half 620 may be used to prevent unwanted movements and rotations of the latch stop 650. The latch stop 650 may be dimensioned such that the top of the bottom leg 530 may seat within the bottom of the latch stop 650 and further dimensioned such that the bottom of the top leg 520 and locking support 680 may seat within the top and be permitted to pass through the latch stop 650.

In assembly, the locking support 680 may seat within the bottom of the top leg 520. The button 660, which may be largely annular shaped, may be situated about the latch stop 650 in assembly with the spring 670 secured between the two. For example, one end of spring 670 may seat on a button spring retaining feature 664 formed within the button 660 positioned behind push-button surface 662. The opposite end of spring 670 may secure to a latch stop spring retaining feature 654 formed on the latch stop 650. Force from spring 670 may cause a button nubbin feature 666 formed within the back of the button 660 to seat within hole feature 656 (FIG. 6B) formed through the back of latch stop 650 and, when the self-standing attachment device 100 (FIG. 2A) is in a deployed state, within a groove feature 686, which may also be largely annular, formed on the locking support 680.

Seating of button nubbin feature 666 within the groove feature 686 formed on the locking support 680 when the self-standing attachment device 100 is in a deployed state may secure the self-standing attachment device 100 in a deployed state until force is applied to the push-button surface 662 of button 660, thus freeing the button nubbin feature 666 from within the annular groove feature 686 on the locking support 680 and allowing the locking support 680 and a bottom portion of the top leg 520 to pass through the latch stop 650 and allow the self-standing attachment device 100 to be repositioned in a stowed state.

While repositioning the self-standing attachment device 100 (FIG. 2A) back into a deployed state, the button nubbin feature 666 may slide along the surface of the top leg 520 until the leg assemblies 210 reach the annular groove feature 686, at which point force from spring 670 may cause the button nubbin feature 666 to again seat within the groove feature 686, thus locking the self-standing attachment device 100 (FIG. 2A) into a deployed state.

Figure 7:
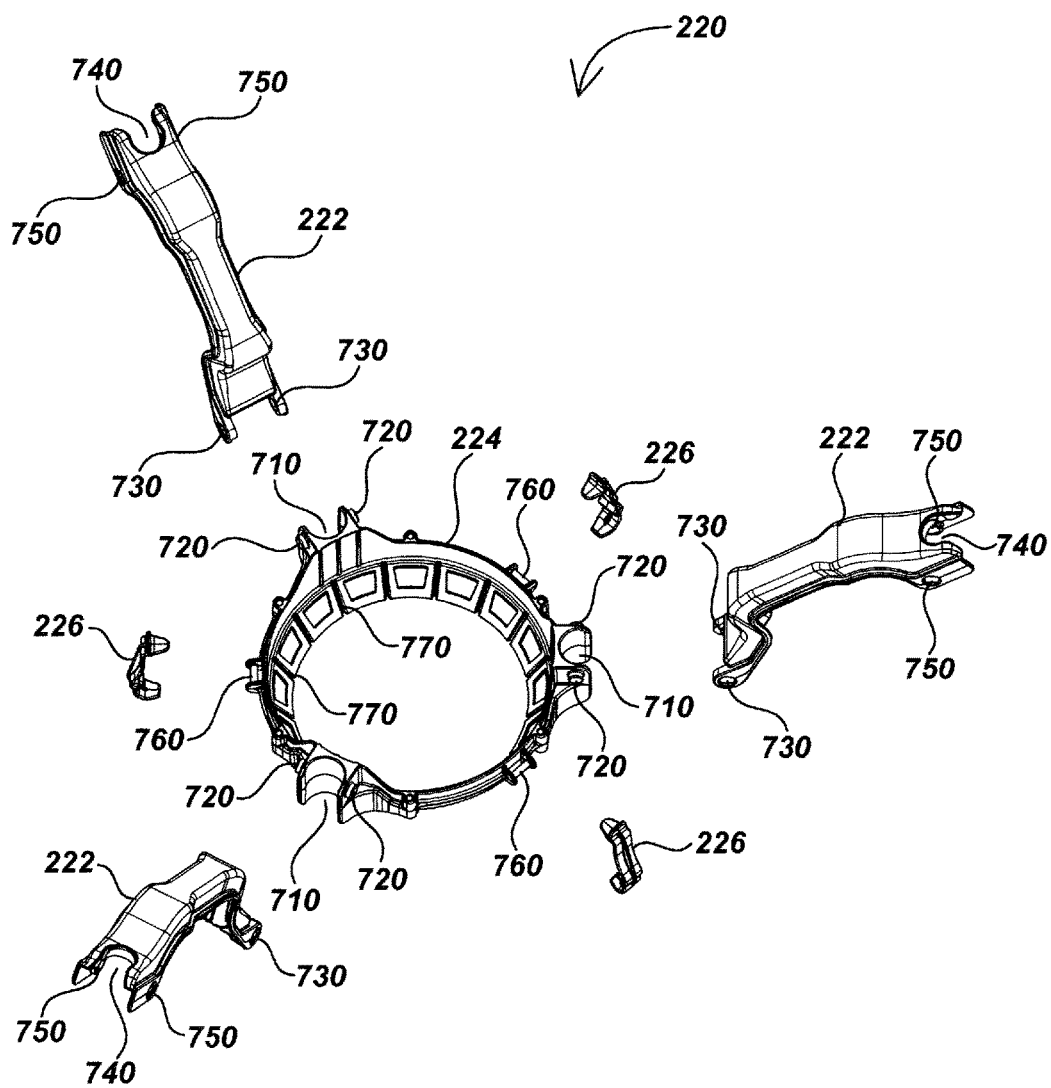
FIG. 7 is an exploded view illustrating details of a bottom assembly embodiment.

FIG. 7 illustrates details of an exemplary embodiment of a bottom assembly 220. Bottom assembly 220 may comprise three leg links 222, a bottom ring mount 224, and a series of ring mount latches 226. The bottom ring mount 224 may be configured to seat a lower antenna node of the locator, such as antenna node 240 (as shown in FIGS. 2A and 2B) on utility locator 110. The bottom ring mount 224 may be further formed with a series of circumferentially spaced stowed state leg retainer features 710. The stowed state leg retainer features 710 formed about bottom ring mount 224 may each be configured to allow one leg assembly 210 to snap into and be retained thereto when the self-standing attachment device 100 is in a stowed state.

Along the sides of each of the stowed state leg retainer features 710, a set of leg link retaining pins 720 may be formed and configured to mate with bottom leg link retaining holes 730 on each the leg link 222. The leg link retaining pins 720 may both secure leg link 222 to the bottom ring mount 224 as well as permit the leg link 222 to pivot about an axis formed between each set of leg link retaining pins 720.

Along the top of each leg link 222 a deployed state leg retainer feature 740 may be configured to allow one leg assembly 210 (as shown in FIG. 2A) to snap into and be retained thereto when the self-standing attachment device 100 is in a deployed state. The securing of leg assemblies 210 within deployed state leg retainer features 740 may provide additional stability to the self-standing attachment device 100 in a deployed state. Along the sides of the deployed state leg retainer feature 740 of each leg link 222, top leg link retaining holes 750 formed on each leg link 222 may secure to the right leg link retaining pins 616 (as shown in FIG. 6A) and left leg link retaining pins 626 on slide latch assembly 212, and be permitted to pivot about an axis formed between right leg link retaining pin 616 and left leg link retaining pin 626.

The ring mount latches 226 may secure to bottom ring mount 224 via ring latch mounting features 760 such that each ring mount latch 226 may pivot, thus opening and closing to secure or free the lower antenna node 240 of utility locator device 110 from the bottom ring mount 224. Each ring mount latch 226 may be shaped such that when opened, a curved bottom section of each ring mount latch 226 grasps a portion of bottom ring mount 224, allowing the ring mount latch 226 to remain in an open and unlocked state. A top curved section of each ring mount latch 226, when closed, may grasp onto grooves (not illustrated) formed on the lower antenna node 240 of utility locator device 110. The ring mount latch 226 may aid in preventing unwanted rotations of the utility locator device 110 when secured.

A series of bottom mount anti-rotational groove features 770 may be formed within the annulus of the bottom ring mount 224 to key to ribs (not illustrated) formed on the lower antenna node 240 of utility locator device 110. The keying of bottom mount anti-rotational groove features 770 and ribs (not illustrated) formed on the lower antenna node 240 may aid in preventing unwanted rotations of the utility locator device 110 when utility locator device 110 is seated within the bottom ring mount 224.

In some alternative self-standing attachment device embodiments, anti-rotational components and features may be omitted, thereby allowing a utility locator device freedom to rotate fully about a vertical axis within the self-standing attachment device.

The present invention is not intended to be limited to the aspects shown herein, but should be accorded the widest scope consistent with the disclosure herein, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c.

The previous description of the disclosed aspects is provided to enable any person skilled in the art to make or use embodiments in accordance with various aspects of the present invention. Various modifications to these aspects will be readily apparent to those skilled in the art, and the generic principles defined herein may be applied to other aspects without departing from the spirit or scope of the invention. Thus, the presently claimed invention is not intended to be limited to the aspects shown herein but is to be accorded the widest scope consistent with the appended claims and their equivalents.

We claim:

1. A buried utility locating system, comprising:
   a buried utility locator; and
   a self-standing attachment device detachably coupled to the buried utility locator, the self-standing attachment device comprising:
   a top assembly including a frame and a coupler for detachably coupling the attachment device to a mast of the buried utility locator;
   a bottom assembly for positioning an antenna node of the buried utility locator near the ground when in a vertical upright orientation; and
   a plurality of leg assemblies having a proximal end and a distal end, with each of the leg assemblies coupled at the proximal end to the top assembly and slidably coupled to the bottom assembly to allow the distal end of the leg assemblies to move inward and outward, wherein the leg assemblies are rotatably coupled to the top assembly.

2. The system of claim 1, wherein the buried utility locator includes a mast and the coupler removably attached to the mast.

3. The system of claim 1, wherein the mast is a round mast and the coupler is shaped in a circular shape that is sized and dimensioned to the mast to flexibly attach by gripping around the mast.

4. The system of claim 1, wherein one or more of the top-assembly, bottom assembly, and leg assemblies comprise all or substantially all non-ferromagnetic materials.

5. The system of claim 1, wherein the leg assemblies comprise telescoping leg elements.

6. The system of claim 1, wherein the top assembly includes a plurality of arms, extending outward from the center of the frame, corresponding to the plurality of leg assemblies, with each leg assembly coupled at an outward-facing end of each arm with a joint.

7. The system of claim 6, wherein the top assembly further includes a rotation stop and a plurality of retaining snap features.

8. The system of claim 1, wherein the coupler is positioned to attach to the buried utility locator at approximately the mid-point of a mast of the locator.

9. The system of claim 1, wherein the plurality of leg assemblies consist of three leg assemblies.

10. The system of claim 9, wherein a first of the three leg assemblies is a rear leg assembly oriented towards the back when coupled to the locator and a second and third of the three leg assemblies are front leg assemblies oriented towards the front of the locator when the locator is in a normal operating orientation.

11. The system of claim 9, wherein ones of the plurality of leg assemblies include a bottom leg and a top leg, and wherein the top leg is sized with cross-sectional dimensions smaller than the bottom leg so at to slide into the bottom leg.

12. The system of claim 11, wherein the top leg and the bottom leg are cylindrical in shape.

13. The system of claim 1, wherein the coupler comprises an inwardly curved feature of the top assembly that is sized and shaped to detachably grip the mast of the buried utility locator.

14. The system of claim 1, wherein the coupler comprises one or more of a clip element, a nut and bolt assembly, and a latch assembly.

15. The system of claim 1, wherein the bottom assembly includes a central section and a plurality of elongated leg links extending outward from the central section, with ones of the leg links coupled to ones of the leg assemblies.

16. The system of claim 15, wherein the bottom assembly includes a plurality of ring latches to couple the bottom assembly to an antenna node of the locator.

17. The system of claim 15, wherein the bottom assembly is coupled to the leg assemblies near the distal end so as to position an antenna node of the buried utility locator near the ground when in a vertical upright orientation with the leg assemblies extended.

18. The system of claim 1, wherein the leg links are coupled to the leg assemblies with a lockable and disengageable slide latch assembly.

19. The system of claim 18, wherein the leg link assemblies include a section having a compacted U-shape conforming to a mast and/or an antenna ball outer shape.

20. The system of claim 17, wherein the central section of the bottom assembly includes a bottom ring mount shaped to surround and secure to an antenna node of the locator.

21. The system of claim 20, wherein the bottom ring mount is circularly shaped and sized to surround the outside surface of the antenna node.

\* \* \* \* \*